United States Patent
Kogure

(10) Patent No.: US 9,942,439 B2
(45) Date of Patent: Apr. 10, 2018

(54) DATA COMMUNICATION APPARATUS, METHOD FOR CONTROLLING THE SAME, AND STORAGE MEDIUM

(71) Applicant: CANON KABUSHIKI KAISHA, Tokyo (JP)

(72) Inventor: Takeshi Kogure, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/071,580

(22) Filed: Mar. 16, 2016

(65) Prior Publication Data

US 2016/0286073 A1    Sep. 29, 2016

(30) Foreign Application Priority Data

Mar. 23, 2015    (JP) ................ 2015-060018

(51) Int. Cl.
*H04N 1/32*    (2006.01)
*H04N 1/00*    (2006.01)

(52) U.S. Cl.
CPC ..... *H04N 1/32037* (2013.01); *H04N 1/00209* (2013.01); *H04N 1/00795* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 7,256,905 B2 * | 8/2007 | Uchikawa | H04L 29/06 358/1.15 |
| 2010/0138655 A1 * | 6/2010 | Matsui | H04L 63/0442 713/168 |
| 2012/0290658 A1 * | 11/2012 | Nishiyama | H04L 12/6418 709/204 |

FOREIGN PATENT DOCUMENTS

| | | | | |
|---|---|---|---|---|
| JP | 2003-030109 | | 1/2003 | ............ G06F 13/00 |
| JP | 2003030109 | * | 1/2003 | |

* cited by examiner

*Primary Examiner* — Fan Zhang
(74) *Attorney, Agent, or Firm* — Fitzpatrick, Cella, Harper & Scinto

(57) ABSTRACT

A data communication apparatus has a transmission function of transmitting data to a pre-set transmission destination. A data communication apparatus, when importing at least one of an address book and setting information based on import data including data that has been exported by another data communication apparatus, determines data to be imported. The data communication apparatus determines, with respect to each of the address book and the setting information, if the address book or the setting information is actually to be imported. Furthermore, if it is determined that either one of the address book and the setting information is to be imported, but the other one is not to be imported, the use of the transmission function is restricted after import processing has been performed based on the import data.

17 Claims, 12 Drawing Sheets

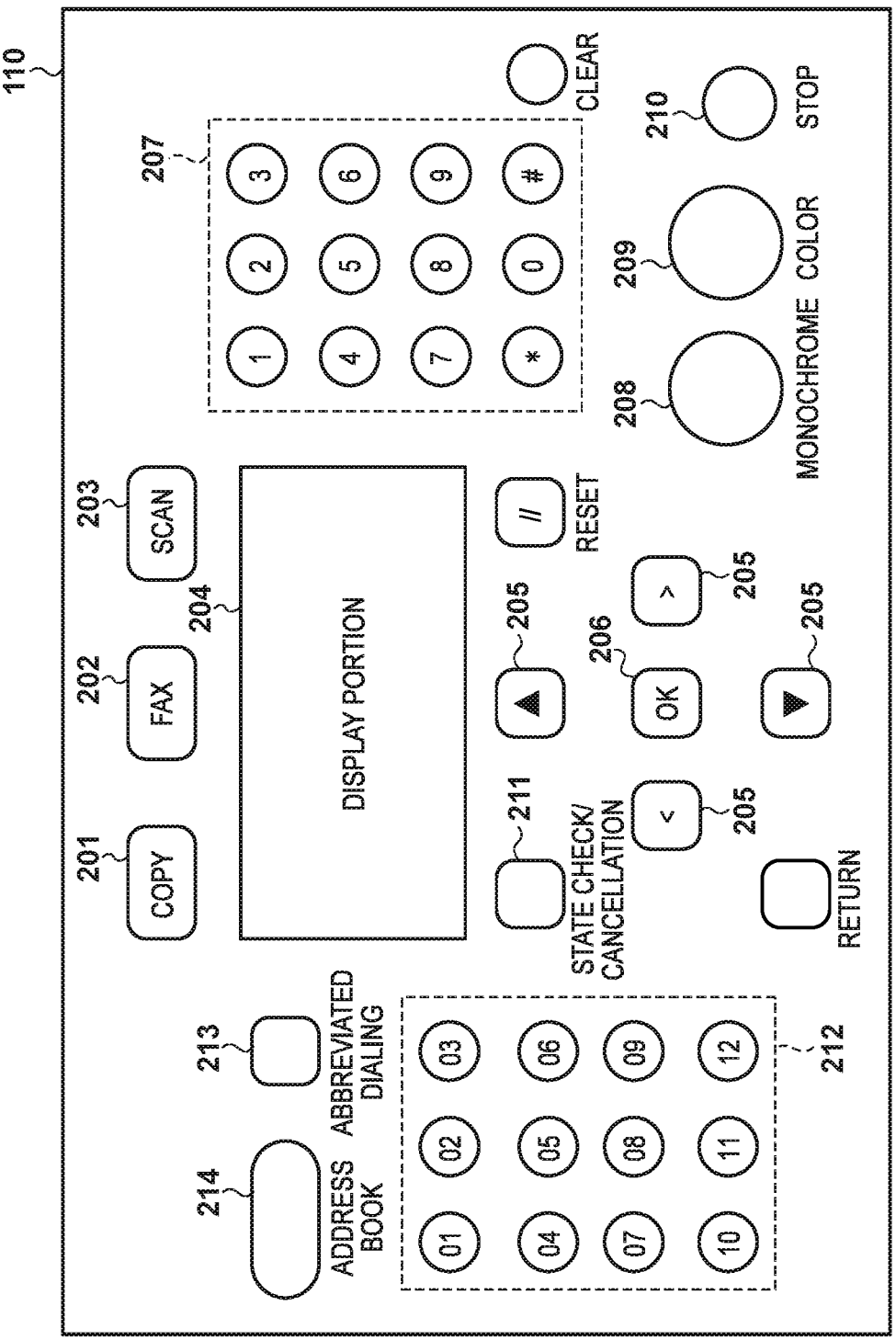

FIG. 3A

TRANSFER FUNCTION SETTINGS

| SETTING ITEM | CONTENT OF SETTING |
|---|---|
| TRANSFER FUNCTION ON/OFF | ON |
| TRANSFER DESTINATION | 001 |

FIG. 3B

ARCHIVE FUNCTION SETTINGS

| SETTING ITEM | CONTENT OF SETTING |
|---|---|
| ARCHIVE FUNCTION ON/OFF | ON |
| ARCHIVE DESTINATION | 002 |

FIG. 3C

ADDRESS BOOK

| INDEX | USER NAME | ADDRESS |
|---|---|---|
| 001 | User1 | 0312345678 |
| 002 | User2 | 0612345678 |
| 003 | User3 | abc@def.jp |

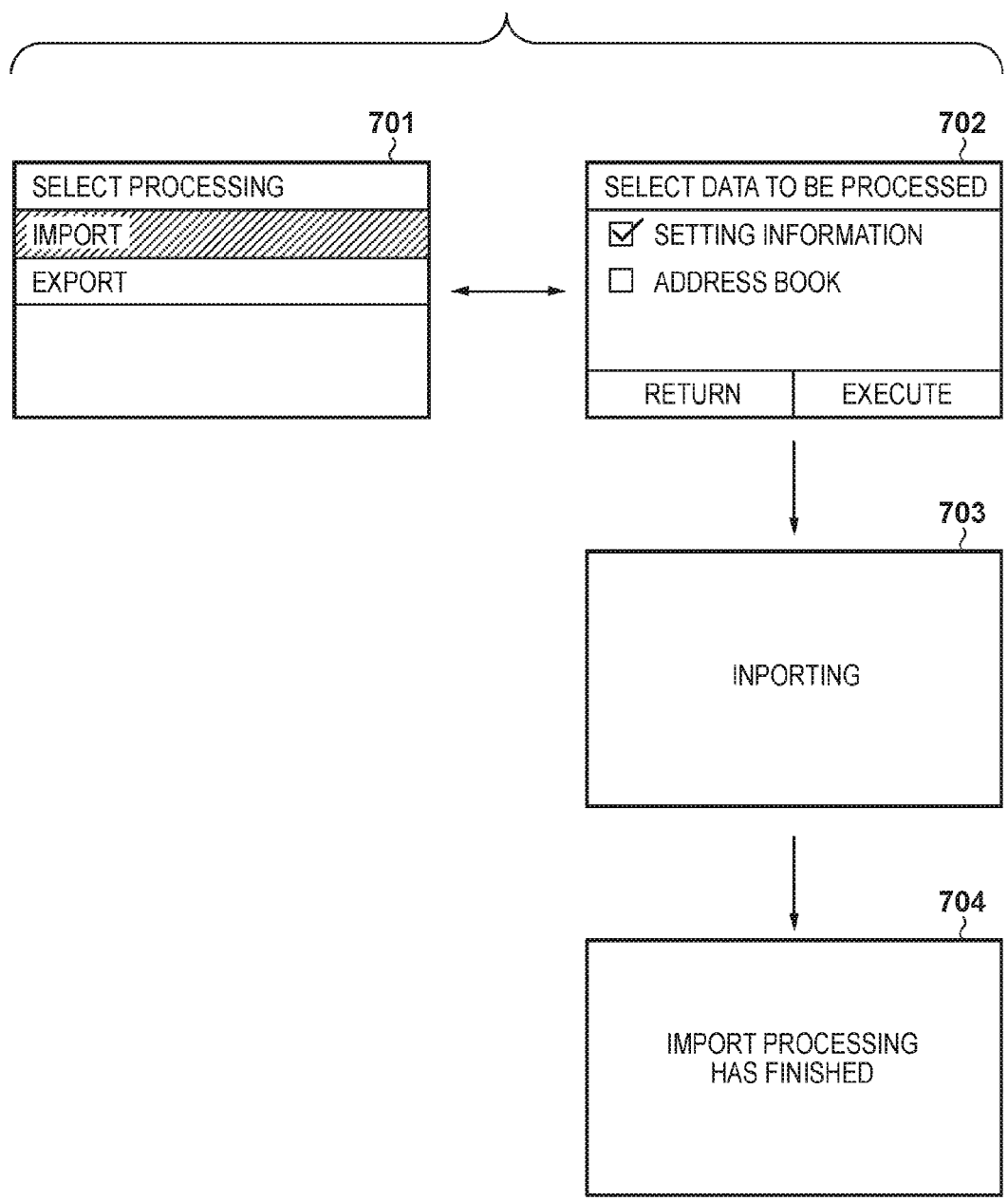

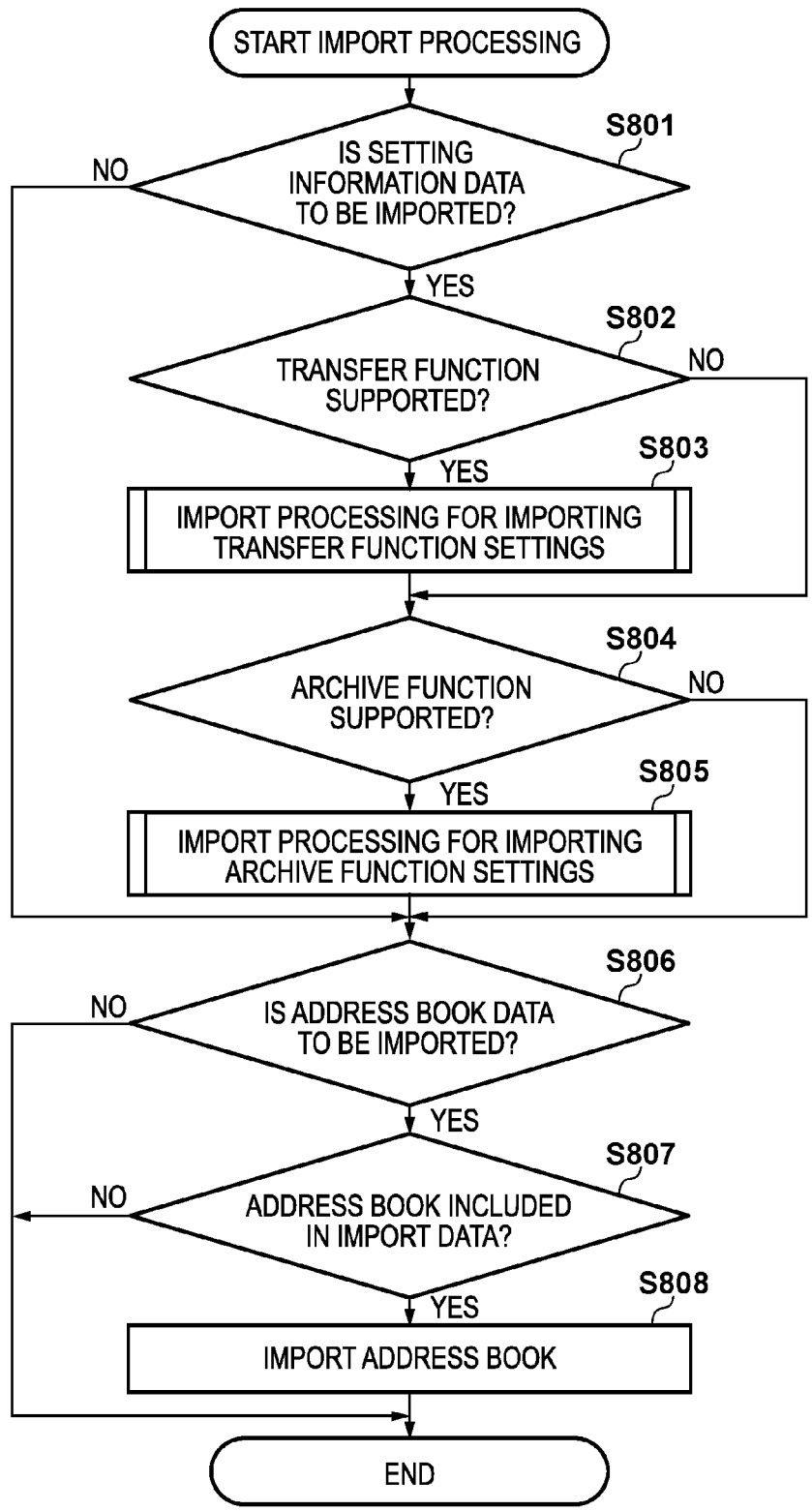

FIG. 10A

```
IMPORT DATA

TRANSFER FUNCTION SETTINGS
TRANSFER FUNCTION: ON
TRANSFER DESTINATION: 002

ARCHIVE FUNCTION SETTINGS
ARCHIVE FUNCTION: ON
ARCHIVE DESTINATION: 003

ADDRESS BOOK
001: User1  0312345678
002: User2  xyz@abcd.com
003: User3  abc@def.jp
```

FIG. 10B

TRANSFER FUNCTION SETTINGS (AFTER IMPORT PROCESSING)

| SETTING ITEM | CONTENT OF SETTING |
|---|---|
| TRANSFER FUNCTION ON/OFF | ON |
| TRANSFER DESTINATION | 002 |

FIG. 10C

ARCHIVE FUNCTION SETTINGS (AFTER IMPORT PROCESSING)

| SETTING ITEM | CONTENT OF SETTING |
|---|---|
| ARCHIVE FUNCTION ON/OFF | ON |
| ARCHIVE DESTINATION | 003 |

FIG. 10D

ADDRESS BOOK (AFTER IMPORT PROCESSING)

| INDEX | USER NAME | ADDRESS |
|---|---|---|
| 001 | User1 | 0312345678 |
| 002 | User2 | xyz@abcd.com |
| 003 | User3 | abc@def.jp |

FIG. 11A

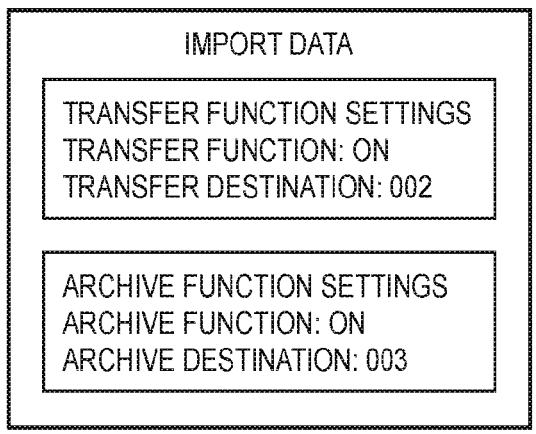

FIG. 11B

TRANSFER FUNCTION SETTINGS (AFTER IMPORT PROCESSING)

| SETTING ITEM | CONTENT OF SETTING |
|---|---|
| TRANSFER FUNCTION ON/OFF | OFF |
| TRANSFER DESTINATION | 002 |

FIG. 11C

ARCHIVE FUNCTION SETTINGS (AFTER IMPORT PROCESSING)

| SETTING ITEM | CONTENT OF SETTING |
|---|---|
| ARCHIVE FUNCTION ON/OFF | OFF |
| ARCHIVE DESTINATION | 003 |

FIG. 11D

ADDRESS BOOK (AFTER IMPORT PROCESSING)

| INDEX | USER NAME | ADDRESS |
|---|---|---|
| 001 | User1 | 0312345678 |
| 002 | User2 | 0612345678 |
| 003 | User3 | abc@def.jp |

DATA COMMUNICATION APPARATUS, METHOD FOR CONTROLLING THE SAME, AND STORAGE MEDIUM

BACKGROUND OF THE INVENTION

Field of the Invention

The present invention relates to a data communication apparatus capable of transmitting data to a transmission destination set by using an address book, a method for controlling the same, and a storage medium.

Description of the Related Art

A data communication apparatus, such as a multi-function peripheral, having a function of transmitting and receiving facsimile (fax) data, email and the like may have a function (transfer function) of transferring data received from another data communication apparatus to a pre-set transfer destination. Alternatively, such a data communication apparatus may have a function (archive function) of, when transmitting data to another data communication apparatus, transmitting the transmitted data to a pre-set transmission destination so as to archive the transmitted data.

Generally, in the data communication apparatus having a transfer function as described above, the transfer destination used by the transfer function can be set by using an address book, and the transfer destination and transfer condition information are stored in association with each other. Japanese Patent Laid-Open No. 2003-30109 proposes a technique for maintaining consistency between the transfer destination and the transfer condition information even when at least one of the transfer setting and the address book is updated.

A data communication apparatus as described above is configured so as to be capable of collectively editing the addresses included in the address book by a function of importing and exporting the address book. However, as a result of the address book being edited by the import function, the address corresponding to the pre-set transfer destination acquired from the address book during operation of the transfer function may be different from the previous address. In this case, a situation may occur in which the transfer function erroneously transfers the data received from another data communication apparatus to a transfer destination unintended by the user. Such a situation is also likely to occur when the archive function described above is used.

As described above, due to the import of data of the address book, setting information indicating the data transmission destination, and the like, there is a possibility that a wrong address may be acquired from the address book during operation of a transmission function, such as the transfer function or the archive function, that transmits data to a pre-set transmission destination. In this case, the data is transmitted to the wrong transmission destination.

SUMMARY OF THE INVENTION

The present invention has been made in view of the problem described above. The present invention provides a technique, used in a data communication apparatus having a transmission function of transmitting data to a pre-set transmission destination, for preventing an erroneous operation of the transmission function after at least one of setting information and an address book is imported based on import data.

According to one aspect of the present invention, there is provided a data communication apparatus comprising: a storage unit configured to store therein an address book including a list of addresses that are available to set a transmission destination to which data is to be transmitted, and setting information indicating a pre-set transmission destination, the setting information being for a transmission function that acquires an address corresponding to the setting information from the address book and transmits data to the acquired address; an import unit configured to import at least one of the address book and the setting information based on import data including data exported by another data communication apparatus; a determination unit configured to determine, with respect to each of the address book and the setting information, whether or not import processing is to be performed by the import unit; and a restriction unit configured to, if it is determined by the determination unit that one of the address book and the setting information is to be imported but the other one is not to be imported, restrict a use of the transmission function after the import processing has been performed by the import unit.

According to another aspect of the present invention, there is provided a method for controlling a data communication apparatus, the data communication apparatus including a storage unit configured to store therein an address book including a list of addresses that are available to set a transmission destination to which data is to be transmitted, and setting information indicating a pre-set transmission destination, the setting information being for a transmission function that acquires an address corresponding to the setting information from the address book and transmits data to the acquired address, the method comprising: importing at least one of the address book and the setting information based on import data including data exported by another data communication apparatus; determining, with respect to each of the address book and the setting information, whether or not import processing is to be performed by the import unit; and if it is determined that one of the address book and the setting information is to be imported but the other one is not to be imported, restricting a use of the transmission function after the import processing has been performed.

According to still another aspect of the present invention, there is provided a non-transitory computer-readable storage medium storing a computer program for causing a computer to execute a method for controlling a data communication apparatus, the data communication apparatus including a storage unit configured to store therein an address book including a list of addresses that are available to set a transmission destination to which data is to be transmitted, and setting information indicating a pre-set transmission destination, the setting information being for a transmission function that acquires an address corresponding to the setting information from the address book and transmits data to the acquired address, the method comprising: importing at least one of the address book and the setting information based on import data including data exported by another data communication apparatus; determining, with respect to each of the address book and the setting information, whether or not import processing is to be performed by the import unit; and if it is determined that one of the address book and the setting information is to be imported but the other one is not to be imported, restricting a use of the transmission function after the import processing has been performed.

According to the present invention, it is possible to, in a data communication apparatus having a transmission function of transmitting data to a pre-set transmission destination, prevent an erroneous operation of the transmission function after at least one of setting information and an address book is imported based on import data.

Further features of the present invention will become apparent from the following description of exemplary embodiments (with reference to the attached drawings).

BRIEF DESCRIPTION OF THE DRAWINGS

FIG. 2 is a diagram showing an example of a configuration of an operation panel of the MFP.

FIGS. 3A to 3C are diagrams showing examples of setting information data with respect to a transfer function and an archive function and address book data.

FIG. 7 is a diagram showing examples of operation screens regarding import processing, which is displayed on the display portion.

FIG. 8 is a flowchart illustrating a procedure of import processing executed by the MFP.

FIGS. 10A to 10D are diagrams showing an example of import data, and examples of setting information and address book data after import processing has been performed based on the import data.

FIGS. 11A to 11D are diagrams showing an example of import data, and examples of setting information and address book data after import processing has been performed based on the import data.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

An exemplary embodiment given below will be described by taking, as an example of a data communication apparatus according to the present invention, a multi-function peripheral (MFP) having a plurality of functions including a printing (print) function, a reading (scan) function and a facsimile (fax) function.

Figure 1:
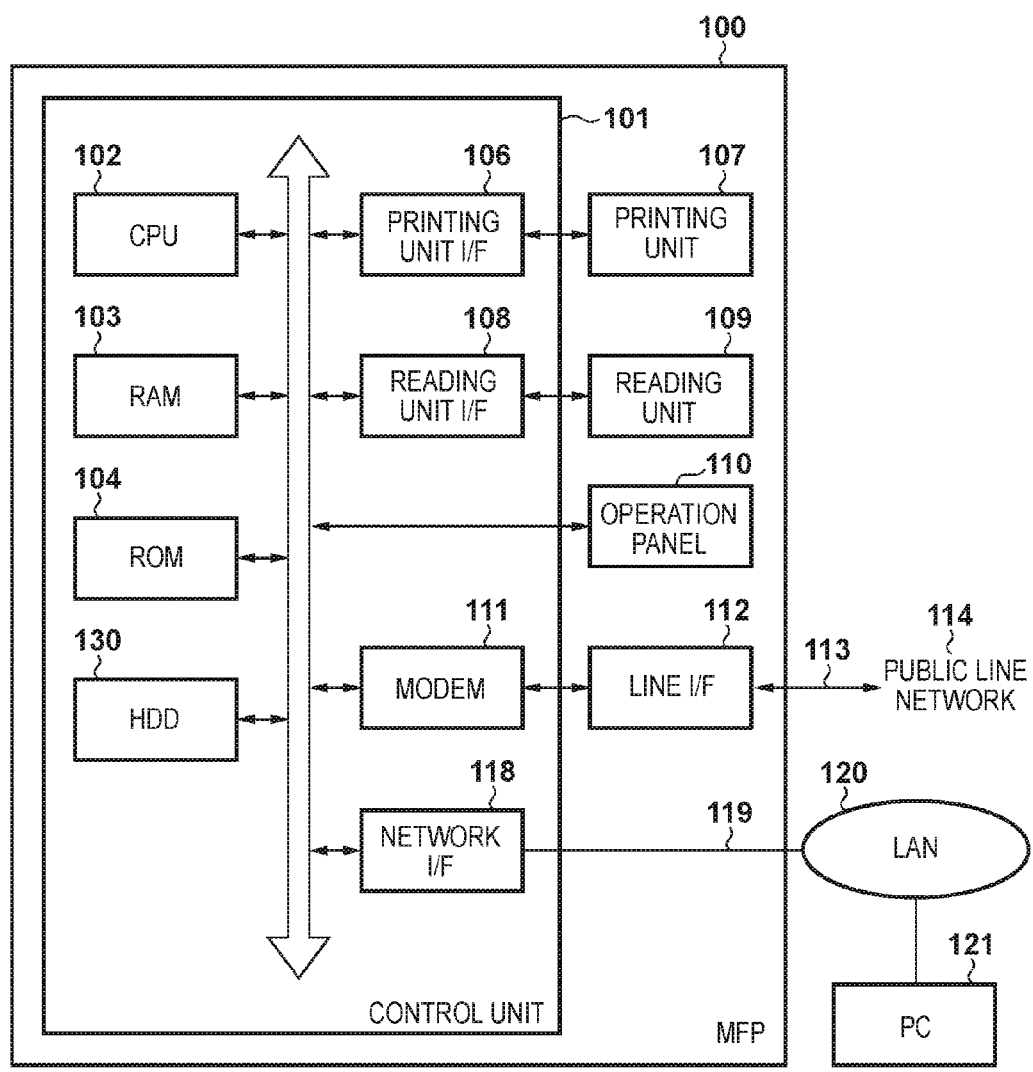
FIG. 1 is a block diagram showing an example of a configuration of an MFP.

FIG. 1 is a block diagram showing an example of a configuration of an MFP 100 according to the present embodiment. The MFP 100 includes a printing unit 107, a reading unit 109, an operation panel 110, a line interface (I/F) 112, and a control unit 101 that controls these devices. The control unit 101 includes a CPU 102, a RAM 103, a ROM 104, a printing unit I/F 106, a reading unit I/F 108, a MODEM 111, a network I/F 118, and a hard disk drive (HDD) 130, and these devices are connected to each other via a system bus 105.

The CPU 102 controls the devices included in the MFP 100 by reading a control program stored in a program area of the ROM 104 or in the HDD 130 into the RAM 103 and executing the control program. In the ROM 104 and the HDD 130, such a control program may be stored in a compressed state or non-compressed state. In a font area of the ROM 104, font information for displaying characters or symbols on a display portion of the operation panel 110 is stored. Likewise, in a data area of the ROM 104, data indicating apparatus information of the MFP 100 and user's address book data are stored. The data stored in the ROM 104 is read by the CPU 102 as needed, and updated as needed. The address book data, and setting information data, which will be described later, may be stored in the ROM 104, or may be stored in the HDD 130. The following description will be given assuming that these sets of data are stored in the ROM 104.

The network I/F 118 is connected to a communication network such as a local area network (LAN) 120 via a communication cable 119. The network I/F 118 performs communication processing for performing communication with an external apparatus such as a host computer (PC) 121 via a LAN 120. The MFP 100 may include a USB I/F so as to make a USB connection to an external apparatus such as the PC 121, or may be configured so as to be capable of communication with an external apparatus via a USB connection rather than the LAN 120.

The line I/F 112 is connected to a public line network 114 via a telephone line 113. The MODEM 111 is connected to the public line network 114 via the line I/F 112, and performs communication processing for performing communication with an external apparatus such as a fax apparatus or a telephone via the public line network 114.

The printing unit I/F 106 is an interface connected to the printing unit 107. The printing unit I/F 106 outputs, to the printing unit 107 (printer engine), an image signal (image data) input from the system bus 105 side under control of the CPU 102. The printing unit 107 executes print processing based on the image data input from the printing unit I/F 106.

The reading unit I/F 108 is an interface connected to the reading unit 109. The reading unit I/F 108 receives image data output from the reading unit 109 (scanner engine) and outputs the received image data to the system bus 105 side under control of the CPU 102. The reading unit 109 executes reading processing for reading an original image and generating image data corresponding to the read image, and outputs the generated image data to the reading unit I/F 108.

The CPU 102 may implement the copy function of the MFP 100 by processing image data obtained by the reading unit 109 having read an original image so as to generate image data to be printed, and causing the printing unit 107 to execute printing based on the generated image data. Also, the CPU 102 may implement the print function or the scan function of the MFP 100 by executing print processing or reading processing in accordance with an instruction received from the PC 121 via the LAN 120.

The MFP 100 has, in addition to the print function, the scan function and the copy function as described above, a fax function and an email function, and these functions can be executed in combination. For example, the MFP 100 can transmit image data, obtained by the reading unit 109 having read an original image, to an external apparatus by fax or email.

FIG. 2 is a diagram showing an example of a configuration of the operation panel 110 of the MFP 100. In the operation panel 110, function keys 201 to 203 are used by a user to select one of the copy function, the fax function and the scan function of the MFP 100 that he/she wants to use. A display portion 204 displays various types of information such as setting state information or operation state information of the MFP 100, or an operation screen. Four arrow keys 205 are used to move a cursor displayed on the display portion 204 or to change a selected item. An OK key 206 is used to provide an instruction to make a decision regarding a setting or selection. A numeric keypad 207 is used to input numerical values such as the number of copies or a telephone number.

A monochrome start key 208 and a color start key 209 are used to provide an instruction to start copying, scanning or transmission by fax. The monochrome start key 208 and the color start key 209 may be integrated as a single key if the MFP 100 is configured to be capable of automatically determining the color of an image (original image) to be copied, scanned or transmitted by fax and then executing processing according to the determined result. A stop key 210 is used to stop the operations of the functions that are under execution in the MFP 100. A state check/cancellation key 211 is used to display, on the display portion 204, a screen for checking the state of processing that is under execution in the MFP 100, and select processing that needs to be stopped.

A one-touch keypad 212, an abbreviated dialing key 213 and an address book key 214 are used to, when data is transmitted by fax or email, easily designate a transmission destination (destination) to which the data is to be transmitted. The one-touch keypad 212 is composed of a plurality of keys, and one destination is registered with respect to each key (button). The user can designate a destination by pressing one of the keys that corresponds to the desired destination. When the user presses the abbreviated dialing key 213, a screen that prompts the user to input a number is displayed on the display portion 204. At this time, the user can designate a destination by inputting a number corresponding to the desired destination by using the numeric keypad 207. The address book key 214 is used to display, on the display portion 204, a list of addresses (destinations) registered in an address book stored in the ROM 104 of the MFP 100. At this time, the user can designate a destination by selecting the desired destination from among the displayed destinations and pressing the OK key 206.

The MFP 100 has a transmission function of transmitting data to a pre-set transmission destination (destination), and the transmission function uses setting information data indicating the pre-set transmission destination and address book data, which are stored in the ROM 104. When the transmission function is executed by the MFP 100, an address corresponding to the setting information is acquired from the address book, and data is transmitted to the acquired address.

The MFP 100 has, as the transmission function, a transfer function and an archive function as described above. The transfer function corresponds to a function of transferring data received from another data communication apparatus to a pre-set transmission destination (transfer destination). The archive function corresponds to a function of, when data is transmitted to another data communication apparatus, transmitting the data to a pre-set transmission destination so as to archive the data.

Examples of Setting Information Data and Address Book Data

FIGS. 3A to 3C are diagrams showing examples of setting information data with respect to the transfer function and the archive function and address book data. As described above, these sets of data are stored in the ROM 104 (or the HDD 130) in advance. The transfer function and the archive function are enabled (active) when "ON" is set, and are disabled (inactive) when "OFF" is set.

FIG. 3A shows setting information data regarding the transfer function, and indicates that the transfer function is set to "ON", and an index "001" in the address book is set as the transfer destination. FIG. 3B shows setting information data regarding the archive function, and indicates that the archive function is set to "ON", and an index "002" in the address book is set as the archive destination.

FIG. 3C shows address book data, and indicates that three addresses that respectively correspond to "User 1", "User 2" and "User 3" are registered in the address book. The address book includes a list of addresses that are available to set a transmission destination to which data is to be transmitted. As shown in FIG. 3C, a plurality of addresses included in the address book may be respectively associated with different indices. In the present embodiment, as shown in FIG. 3C, the addresses that can be registered in the address book are telephone numbers that can be used to perform transmission by fax, or email addresses that can be used to perform transmission by email.

As shown in FIGS. 3A and 3B, the transfer destination of the transfer function and the archive destination of the archive function are set by using an index included in the address book. If the transfer function is executed in accordance with the transfer function settings shown in FIG. 3A, transmission by fax is performed to transfer data by using the address (telephone number: 0312345678) corresponding to the index "001" as the destination. If the archive function is executed in accordance with the archive function settings shown in FIG. 3B, transmission by fax is performed to transfer data by using the address (telephone number: 0612345678) corresponding to the index "002" as the destination. As described above, the setting information indicating the transfer destination and the archive destination shown in FIGS. 3A and 3B is an example of setting information indicating a pre-set transmission destination.

Examples of Operation Screens Regarding Export Processing

Figure 4:
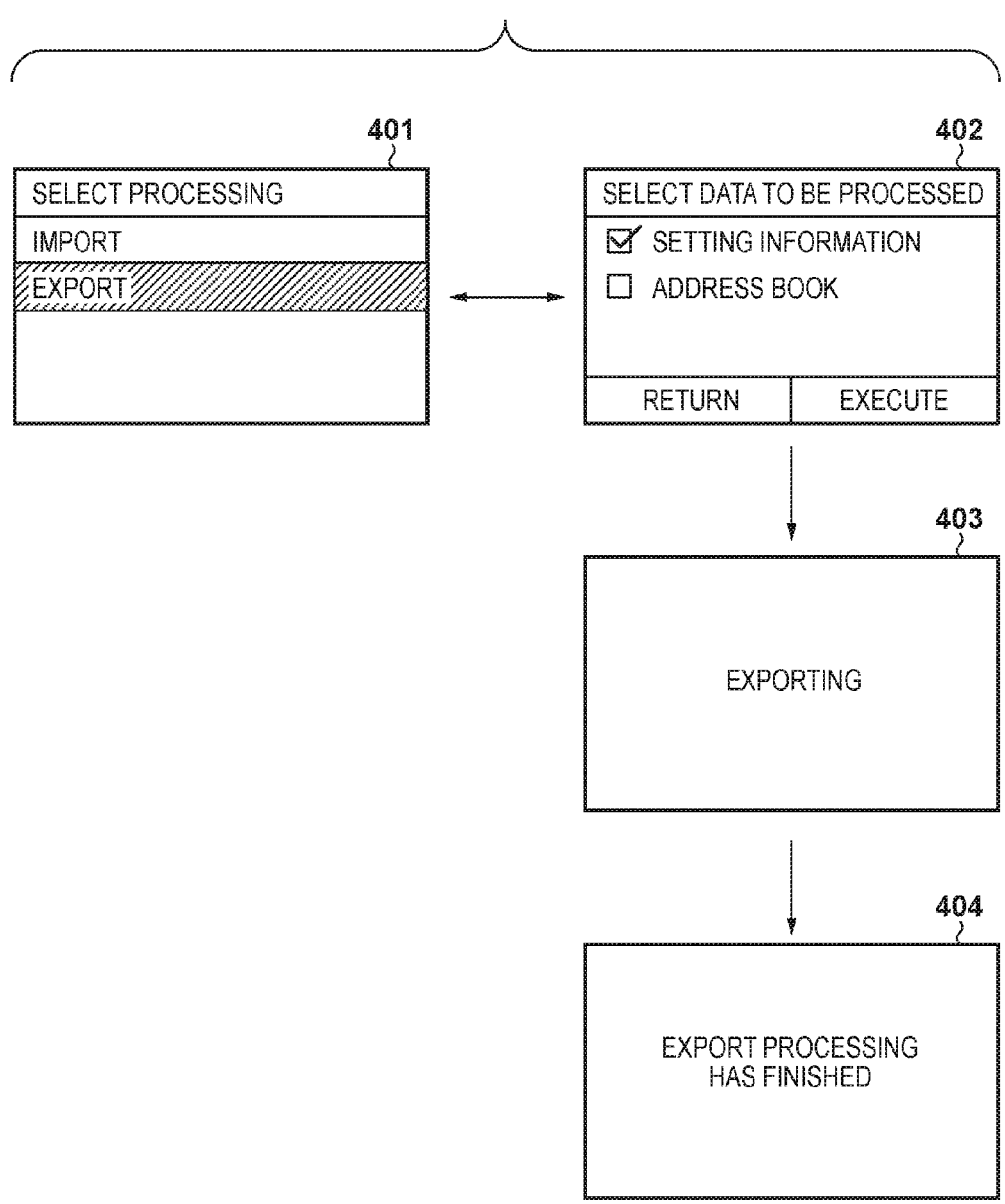
FIG. 4 is a diagram showing examples of operation screens regarding export processing, which is displayed on a display portion.

FIG. 4 is a diagram showing examples of operation screens regarding export processing, which are displayed on the display portion 204. FIG. 4 shows, in particular, the transition of an operation screen when export processing for exporting the setting information and the address book stored in the MFP 100 is executed in response to an instruction given by the user using the operation panel 110.

A screen 401 is a screen that is used to select import processing for importing the setting information and the address book or export processing for exporting the same to be executed. If "export" is selected by the user on the screen 401, the screen displayed on the display portion 204 is transitioned to a screen 402.

The screen 402 is a screen that is used to select, as data to be exported, at least one from the setting information and the address book. If the user selects at least one of "setting information" and "address book" on the screen 402 and presses the "execute" button, the screen displayed on the display portion 204 is transitioned to a screen 403, and export processing for exporting the selected data is started. If the user presses the "return" button on the screen 402, the screen displayed on the display portion 204 is brought back to the screen 401.

The screen 403 is a screen displayed on the display portion 204 during execution of the export processing. Upon completion of the export processing, the screen displayed on the display portion 204 is transitioned to a screen 404 indicating that the export processing has finished.

Procedure of Export Processing

Figure 5:
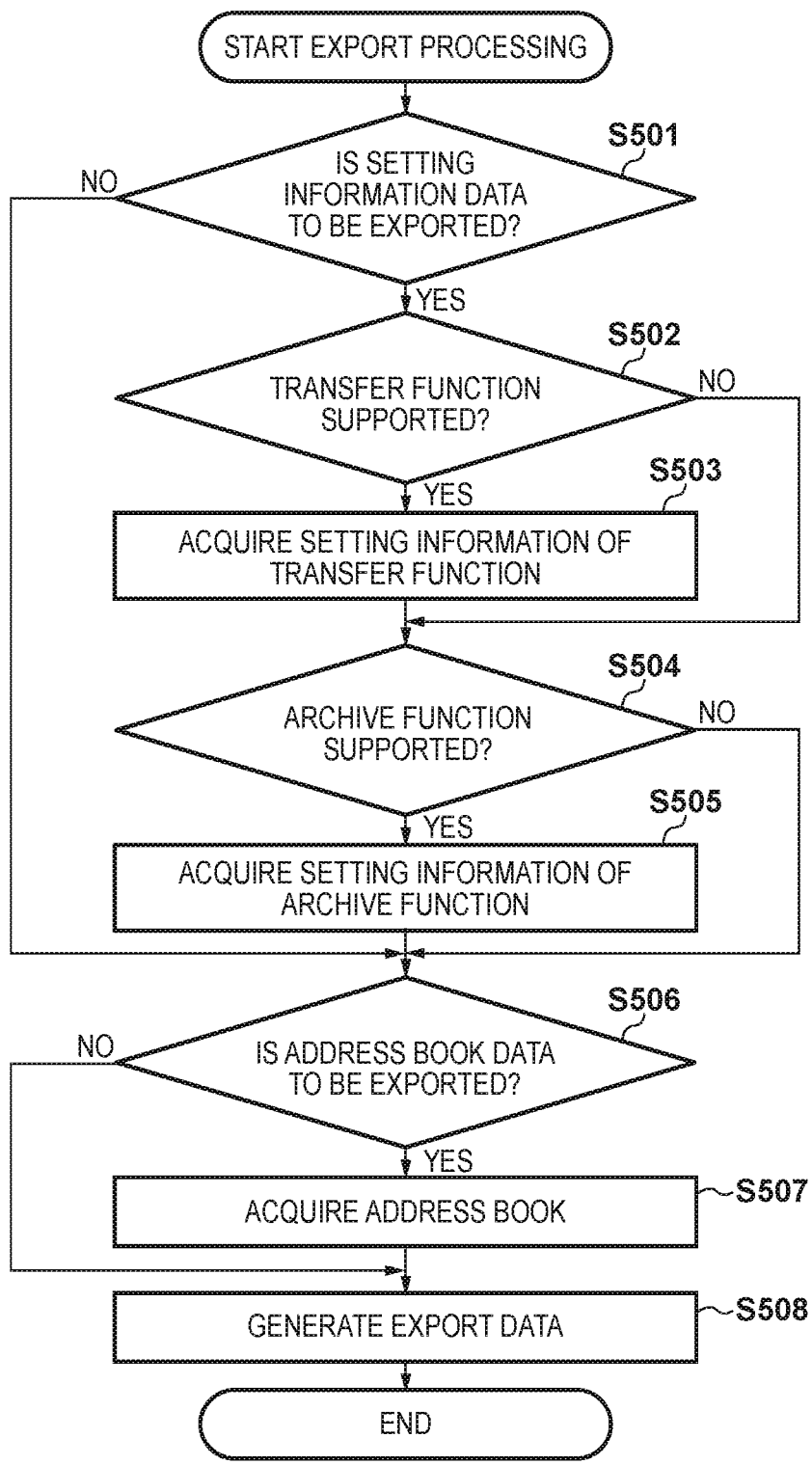
FIG. 5 is a flowchart illustrating a procedure of export processing executed by the MFP.

FIG. 5 is a flowchart illustrating a procedure of the export processing executed by the MFP 100. The processing performed in the steps shown in the flowchart of FIG. 5 is implemented in the MFP 100 by the CPU 102 reading and executing a control program stored in the ROM 104 or the HDD 130. The CPU 102 starts the procedure shown in FIG. 5 in response to the "execute" button on the screen 402 shown in FIG. 4 being pressed by the user.

In S501, the CPU 102 determines whether or not the setting information is data to be exported by determining whether or not the setting information has been selected on the screen 402 as the data to be exported. If it is determined that the setting information is data to be exported, the CPU 102 advances the processing to S502. If it is determined that the setting information is not data to be exported, the CPU 102 advances the processing to S506.

In S502, the CPU 102 determines whether or not the above-described transfer function is supported by the MFP 100. If it is determined that the transfer function is supported by the MFP 100, the CPU 102 advances the processing to S503. If it is determined that the transfer function is not supported by the MFP 100, the CPU 102 advances the processing to S504. In S503, the CPU 102 acquires the setting information regarding the transfer function as shown in FIG. 3A, and advances the processing to S504.

In S504, the CPU 102 determines whether or not the above-described archive function is supported by the MFP 100. If it is determined that the archive function is supported by the MFP 100, the CPU 102 advances the processing to S505. If it is determined that the archive function is not supported by the MFP 100, the CPU 102 advances the processing to S506. In S505, the CPU 102 acquires the setting information regarding the archive function as shown in FIG. 3B, and advances the processing to S506.

In S506, the CPU 102 determines whether or not the address book is data to be exported by determining whether or not the address book has been selected on the screen 402 as the data to be exported. If it is determined that the address book is data to be exported, the CPU 102 advances the processing to S507. If it is determined that the address book is not data to be exported, the CPU 102 advances the processing to S508. In S507, the CPU 102 acquires the address book as shown in FIG. 3C, and advances the processing to S508.

In S508, the CPU 102 generates export data including the data acquired as the data to be exported in steps S503, S505 and S507, and ends the processing. In S508, the CPU 102 may display, on the display portion 204, the screen 404 indicating that the export processing has finished.

Examples of Export Data

Figure 6A:
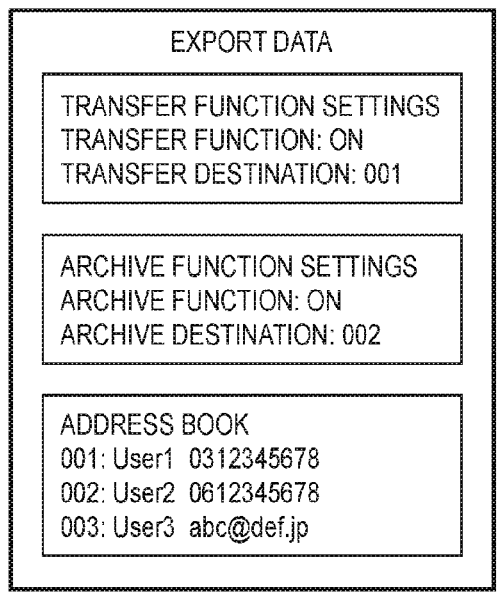
FIGS. 6A to 6D are diagrams showing examples of export data generated in S508 shown in FIG. 5.
Figure 6B:
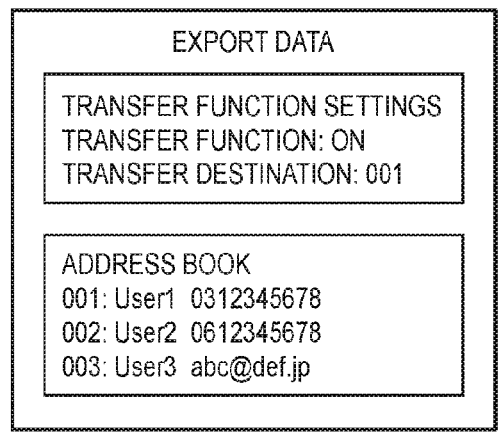
Figure 6C:
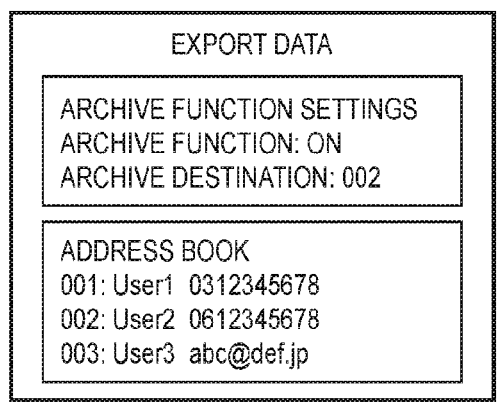
Figure 6D:
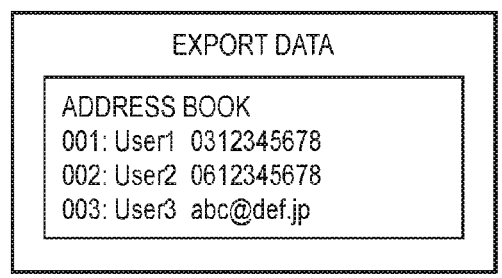

FIGS. 6A to 6D are diagrams showing examples of export data generated in S508 shown in FIG. 5. FIG. 6A is an example of export data generated in the case where "setting information" and "address book" are selected as the data to be exported, and the MFP 100 supports the transfer function and the archive function. FIG. 6B is an example of export data generated in the case where "setting information" and "address book" are selected as the data to be exported, and the MFP 100 supports only the transfer function. FIG. 6C is an example of export data generated in the case where "setting information" and "address book" are selected as the data to be exported, and the MFP 100 supports only the archive function. FIG. 6D is an example of export data generated in the case where only "address book" is selected as the data to be exported.

As shown in FIGS. 6A to 6D, the content of export data generated in S508 varies depending on the data selected as the data to be exported, and the supported state of the transfer function and the archive function by the MFP 100.

Examples of Operation Screens Regarding Import Processing

FIG. 7 is a diagram showing examples of operation screens regarding import processing, which are displayed on the display portion 204. FIG. 7 shows, in particular, the transition of an operation screen when import processing for importing the setting information and the address book stored in the MFP 100 is executed in response to an instruction given by the user using the operation panel 110.

A screen 701 is a screen that is used to select import processing for importing the setting information and the address book or export processing for exporting the same to be executed. If "import" is selected by the user on the screen 701, the screen displayed on the display portion 204 is transitioned to a screen 702.

The screen 702 is a screen that is used to select, as data to be imported, at least one from the setting information and the address book. If the user selects at least one of "setting information" and "address book" on the screen 702 and presses the "execute" button, the screen displayed on the display portion 204 is transitioned to a screen 703, and import processing for importing the selected data is started. If the user presses the "return" button on the screen 702, the screen displayed on the display portion 204 is brought back to the screen 701.

The screen 703 is a screen displayed on the display portion 204 during execution of the import processing. Upon completion of the import processing, the screen displayed on the display portion 204 is transitioned to a screen 704 indicating that the import processing has finished.

Overview of Import Processing

Next, a description will be given of import processing for importing at least one of the address book and the setting information into the MFP 100 by using, as import data, the export data generated by the export processing described above performed by another MFP. In the present embodiment, the MFP 100 executes the following processing in order to prevent an erroneous operation of the transmission function (the transfer function and the archive function) after at least one of the address book and the setting information has been imported based on the import data.

To be specific, when at least one of the address book and the setting information is imported based on import data including the data that has been exported by another MFP, the CPU 102 determines data to be imported. In other words, the CPU 102 determines, with respect to each of the address book and the setting information, whether or not the address book or the setting information is data that is actually to be imported. Furthermore, if it is determined that either one of the address book and the setting information is to be imported but the other one is not to be imported, the CPU 102 restricts the use of the transmission function (the transfer function and the archive function) after import processing has been performed based on the import data. As described above, the CPU 102 restricts the use of the transmission function based on the import data except when both the address book and the setting information are imported. The restriction of the transmission function can be implemented by imposing a restriction such that the data is not transmitted, by the transmission function, to a transmission destination indicated by the setting information stored in the ROM 104.

Procedure of Import Processing

FIG. 8 is a flowchart illustrating a procedure of import processing executed by the MFP 100. The processing performed in the steps shown in the flowchart of FIG. 8 is implemented in the MFP 100 by the CPU 102 reading and executing a control program stored in the ROM 104 or the HDD 130. The CPU 102 starts the procedure shown in FIG. 8 in response to the "execute" button on the screen 702 shown in FIG. 7 being pressed by the user.

In S801, the CPU 102 determines whether or not the setting information is data to be imported by determining whether or not the setting information has been selected on the screen 702 as the data to be imported. In other words, the CPU 102 decides, in accordance with an instruction from the user, whether or not the setting information is the data to be imported. If it is determined that the setting information is the data to be imported, the CPU 102 advances the processing to S802. If it is determined that the setting information is not the data to be imported, the CPU 102 advances the processing to S806.

In S802, the CPU 102 determines whether or not the transfer function is supported by the MFP 100. If it is determined that the transfer function is supported by the MFP 100, the CPU 102 advances the processing to S803. If it is determined that the transfer function is not supported by the MFP 100, the CPU 102 advances the processing to S804. In S803, the CPU 102 executes import processing for importing transfer function settings based on the import data according to the procedure shown in FIG. 9A, and thereafter advances the processing to S804.

In S804, the CPU 102 determines whether or not the archive function is supported by the MFP 100. If it is determined that the archive function is supported by the MFP 100, the CPU 102 advances the processing to S805. If it is determined that the archive function is not supported by the MFP 100, the CPU 102 advances the processing to S806. In S805, the CPU 102 executes import processing for importing archive function settings based on the import data according to the procedure shown in FIG. 9B, and thereafter advances the processing to S806.

In S806, the CPU 102 determines whether or not the address book is the data to be imported by determining whether or not the address book has been selected on the screen 702 as the data to be imported. In other words, the CPU 102 decides, in accordance with an instruction from the user, whether or not the address book is the data to be imported. If it is determined that the address book is the data to be imported, the CPU 102 advances the processing to S807. If, on the other hand, it is determined that the address book is not the data to be imported, the CPU 102 ends the processing.

In S807, the CPU 102 determines whether or not the address book is included in the import data. If it is determined that the address book is not included in the import data, the CPU 102 ends the processing. If it is determined that the address book is included in the import data, the CPU 102 advances the processing to S807. In S807, the CPU 102 imports the address book included in the import data. To be specific, the CPU 102 changes the address book data stored in the ROM 104 or the HDD 130 such that the address book included in the import data can be used in the MFP 100. After that, the CPU 102 ends the processing. In response to the completion of the import processing, the CPU 102 may display, on the display portion 204, the screen 704 indicating that the import processing has finished.

Import Processing for Importing Transfer Function Settings

Figure 9A:
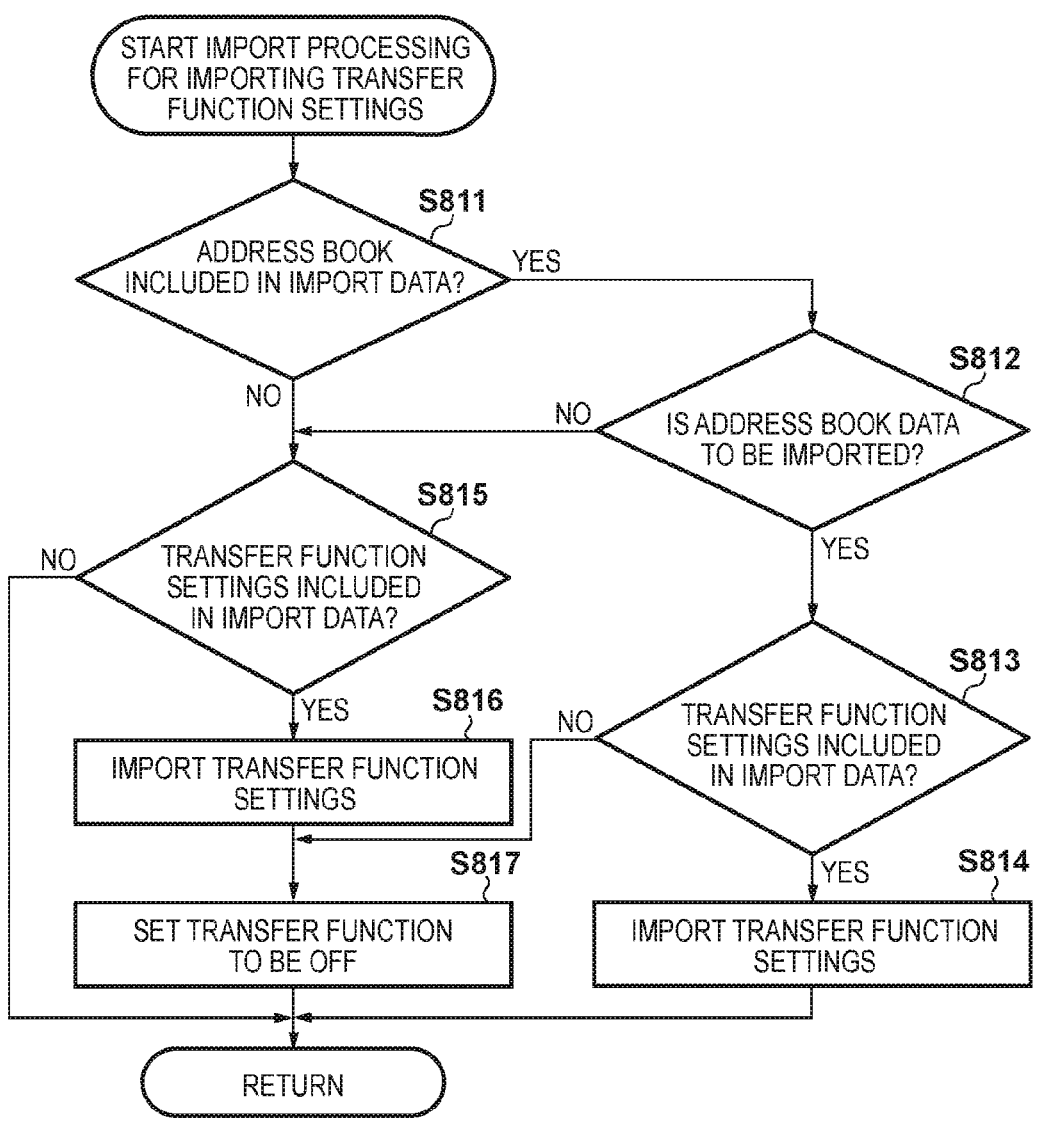
FIGS. 9A and 9B are flowcharts respectively illustrating a procedure of import processing for importing transfer function settings and a procedure of import processing for importing archive function settings.

FIG. 9A is a flowchart illustrating a procedure of import processing for importing the transfer function settings. In S811, the CPU 102 determines whether or not the address book is included in the import data. If it is determined that the address book is not included in the import data, the CPU 102 advances the processing to S815. If it is determined that the address book is included in the import data, the CPU 102 advances the processing to S812. In S812, the CPU 102 determines whether or not the address book is the data to be imported. If it is determined that the address book is not the data to be imported, the CPU 102 advances the processing to S815. If it is determined that the address book is the data to be imported, the CPU 102 advances the processing to S813.

If the address book is not included in the import data, or if the address book is not the data to be imported ("NO" in S811 or S812), the transfer function settings may be imported without the address book being imported. Here, the content of the address book stored in the MFP that has exported the transfer function settings, which is the data to be imported, may be different from the content of the address book stored in the MFP 100. In this case, there is a possibility that, even when the transfer destination set before being exported and the transfer destination (index) set after being imported are the same, the transfer destination may be changed (the address indicating the index may be changed). As a result, after completion of the import processing, data is transferred, by the transfer function, to a transfer destination unintended by the user. In the present embodiment, in order to prevent the occurrence of such a situation, if the transfer function settings are imported without the address book being imported, the transfer function is set to "OFF" (disabled) so as to stop the operation of the transfer function.

To be specific, in S815, the CPU 102 determines whether or not the transfer function settings are included in the import data. If it is determined that the transfer function settings are included in the import data, in the next step, S816, the CPU 102 imports the transfer function settings included in the import data. Furthermore, in S817, the CPU 102 sets the transfer function to be "OFF", and ends the processing. By doing so, the operation of the transfer function is stopped to prevent transfer of data to a transfer destination unintended by the user as described above.

If, on the other hand, it is determined that the transfer function settings are not included in the import data, the CPU 102 ends the processing without setting the transfer function to be "OFF". This is because the transfer destination is not changed unless the transfer function settings are imported, and thus transfer of data to a transfer destination unintended by the user will not occur.

If, on the other hand, the address book is included in the import data, and the address book is the data to be imported ("YES" in S812), unless the transfer function settings are included in the import data, the address book is imported without the transfer function settings being imported. In this case, the transfer destination set in the MFP 100 is not changed before and after the import processing. However, if the address book is changed before and after the import processing, there is a possibility that the transfer destination may be changed (the address indicating the index may be changed). As a result, as described above, after completion of the import processing, data is transferred, by the transfer function, to a transfer destination unintended by the user. Accordingly, in order to prevent the occurrence of such a situation, if the address book is imported without the transfer function settings being imported, the transfer function is set to be "OFF" (disabled) so as to stop the operation of the transfer function.

To be specific, in S813, the CPU 102 determines whether or not the transfer function settings are included in the import data. If it is determined that the transfer function settings are included in the import data, in the next step, S814, the CPU 102 imports the transfer function settings included in the import data. In this case, both the transfer function settings and the address book are imported based on the import data, and thus transfer of data to a transfer destination unintended by the user as described above will not occur. Accordingly, in this case, the CPU 102 ends the processing without setting the transfer function to be "OFF".

If, on the other hand, it is determined in S813 that the transfer function settings are included in the import data, in the next step, S817, the CPU 102 sets the transfer function to be "OFF", and thereafter ends the processing. By doing so, the operation of the transfer function is stopped to prevent transfer of data to a transfer destination unintended by the user as described above.

In the manner described above, with respect to each of the address book and the setting information (transfer function settings), if it is determined that data corresponding to the address book or the setting information is not included in the import data ("NO" in S811 or S813), the CPU 102 determines that the import processing is not to be performed. Furthermore, the CPU 102 restricts the use of the transfer function by stopping the operation of the transfer function in S817 in accordance with the determined result. If it is determined that the address book is not the data to be imported ("NO" in S812), the CPU 102 restricts the use of the transfer function by stopping the operation of the transfer function in S817 when importing the setting information (transfer function settings).

Import Processing for Importing Archive Function Settings

Figure 9B:
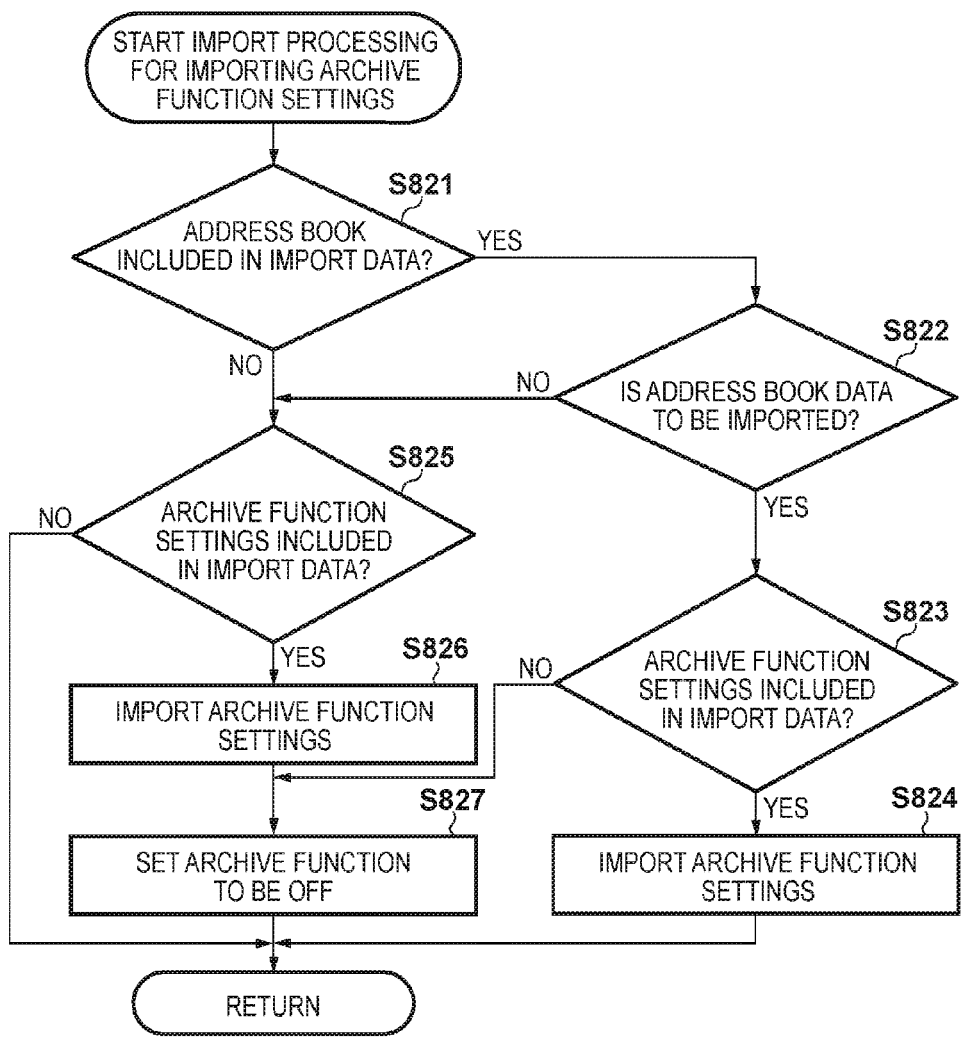

FIG. 9B is a flowchart illustrating a procedure of import processing for importing the archive function settings. The processing performed in steps S821 to S827 shown in FIG. 9B can be implemented in the same manner as the processing performed in steps S811 to S817 shown in FIG. 9A by changing the setting information regarding the transfer function used as the data to be imported to the setting information regarding the archive function.

FIGS. 10A to 10D are diagrams showing an example of import data (FIG. 10A) and examples of setting information and address book data after import processing has been performed based on the import data (FIGS. 10B to 10D). FIGS. 10B to 10D show the setting information and the address book that have been imported through import processing performed based on the import data shown in FIG. 10A when the setting information and the address book shown in FIGS. 3A to 3C are stored in the MFP 100. It is assumed here that all of the data included in the import data are used as the data to be imported.

The import data shown in FIG. 10A includes both the setting information regarding the transfer function and the archive function and the address book. In this case, because both the setting information and the address book are imported, after completion of the import processing, transfer (archiving) of data to a transfer destination (archive destination) unintended by the user as described above will not occur. Accordingly, as shown in FIGS. 10B and 10C, the transfer function and the archive function are not changed from "ON" to "OFF" along with the import processing.

FIGS. 11A to 11D are diagrams showing an example of import data (FIG. 11A) and examples of setting information and address book data after import processing has been performed based on the import data (FIGS. 11B to 11D), which are different from those of FIGS. 10A to 10D. FIGS. 11B to 11D show the setting information and the address book that have been imported through import processing performed based on the import data shown in FIG. 11A when the setting information and the address book shown in FIGS. 3A to 3C are stored in the MFP 100. It is assumed here that all of the data included in the import data are used as the data to be imported.

The import data shown in FIG. 11A includes the setting information regarding the transfer function and the archive function, but does not include an address book, and thus only the setting information is imported without an address book being imported. In this case, it is necessary to prevent transfer (archiving) of data to a transfer destination (archive destination) unintended by the user from being performed by the transfer function (archive function) after completion of the import processing. Accordingly, as shown in FIGS. 11B and 11C, the transfer function and the archive function are changed from "ON" to "OFF" along with the import processing, and thereby the operations of the transfer function and the archive function are stopped.

As described above, in the present embodiment, the following cases are determined: the case where the address book is imported but the transfer function settings (archive function settings) are not imported; and the case where the transfer function settings are imported but the address book is not imported. Furthermore, in either case, the transfer function (archive function) is set to be "OFF" so as to restrict the use of the function. By doing so, it is possible to prevent transfer (transmission) of data to a transfer destination (archive destination) unintended by the user from being performed by the transfer function (archive function) after import processing has been performed based on import data. According to the present embodiment, even when the user uses the MFP 100 without being aware of the presence of the transfer function and the archive function, it is possible to prevent a situation in which data is automatically transmitted to a transmission destination unintended by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-060018, filed Mar. 23, 2015, which is hereby incorporated by reference herein in its entirety.

What is claimed is:

1. A data communication apparatus comprising:
a storage device that stores address information including an identifier and an address associated with the identifier, and transfer destination information including the identifier but not including the address;
a communication interface used to communicate data;
at least one processor that executes a set of instructions to:
acquire, based on the identifier included in the transfer destination information, an address associated with the identifier from the address information;
transfer data received from outside of the apparatus to the acquired address via the communication interface; and
import at least one of address information and transfer destination information to store the imported information in the storage device,
wherein the at least one processor executes the instructions to i) not disable transfer of the data based on the transfer destination information in a case where both of the address information and the transfer destination information are imported and ii) disable transfer of the data based on the transfer destination information in a case where one of the address information and the transfer destination information is imported and the other of the address information and the transfer destination information is not imported.

2. The data communication apparatus according to claim 1, further comprising:
a user I/F that accepts an import instruction,
wherein the at least one processor executes the instructions to perform the importing in accordance with accepting, via the user I/F, the import instruction for at least one of the address information and the transfer destination information.

3. The data communication apparatus according to claim 1,
wherein the address information includes a plurality of identifiers and a plurality of addresses associated respectively with the plurality of identifiers, and
the transfer destination information includes at least one identifier of the plurality of identifiers included in the address information.

4. The data communication apparatus according to claim 1, wherein the at least one processor executes the instructions to acquire, for the address information stored in the storage device, address information that includes an address different from the address associated with the identifier.

5. The data communication apparatus according to claim 1, wherein the at least one processor executes the instructions to import transfer destination information different from the transfer destination information stored in the storage device.

6. The data communication apparatus according to claim 1, wherein:
the at least one processor executes the instructions to acquire, from another data communication apparatus, at least one of address information to be imported and transfer destination information to be imported.

7. The data communication apparatus according to claim 6, wherein the at least one processor executes the instructions to
import all of address information acquired by the information acquisition unit, and
import all of transfer destination information acquired from the other data communication apparatus.

8. The data communication apparatus according to claim 1, further comprising
a printer that is capable of printing data received by the communication interface.

9. A method for controlling a data communication apparatus, the data communication apparatus including a storage device that stores address information including an identifier and an address associated with the identifier, and transfer destination information including the identifier but not including the address, and a communication interface used to communicate data,
the method comprising the steps of:
acquiring, based on the identifier included in the transfer destination information, an address associated with the identifier from the address information;
transfer data received from outside of the apparatus to the acquired address via the communication interface;
importing at least one of address information and transfer destination information to store the imported information in the storage device; and
operating the data communication apparatus to i) not disable transfer of the data based on the transfer destination information in a case where both of the address information and the transfer destination information are imported, and ii) disable transfer of the data based on the transfer destination information in a case where one of the address information and the transfer destination information is imported and the other of the address information and the transfer destination information is not imported.

10. A data communication apparatus comprising:
a storage device that stores address information including an identifier and an address associated with the identifier, and transmission destination information including the identifier but not including the address;
a communication interface used to communicate data;
at least one processor that executes a set of instructions to:
acquire, based on the identifier included in the transmission destination information, an address associated with the identifier from the address information;
transmit data transmitted to a first data communication apparatus, to a second communication apparatus that corresponds to the acquired address via the communication interface; and
import at least one of address information and transmission destination information to store the imported information in the storage device,
wherein the at least one processor executes the instructions to i) not disable transmission of the data based on the transmission destination information in a case where both of the address information and the transmission destination information are imported, and ii) disable transmission of the data based on the transmission destination information in a case where one of the address information and the transmission destination information is imported and the other of the address information and the transmission destination information is not imported.

11. The data communication apparatus according to claim 10, further comprising
a user I/F that accepts an import instruction,
wherein the at least one processor executes the instructions to perform the importing in accordance with accepting, via the user I/F, the import instruction for at least one of the address information and the transmission destination information.

12. The data communication apparatus according to claim 10, wherein
the address information includes a plurality of identifiers and a plurality of addresses associated respectively with the plurality of identifiers, and
the transmission destination information includes at least one identifier of the plurality of identifiers included in the address information.

13. The data communication apparatus according to claim 10, wherein the at least one processor executes the instructions to import, for the address information stored in the storage device, address information that includes an address different from the address associated with the identifier.

14. The data communication apparatus according to claim 10, wherein the at least one processor executes the instructions to import transmission destination information different from the transmission destination information stored in the storage device.

15. The data communication apparatus according to claim 10, wherein the at least one processor executes the instructions to acquire, from a third data communication apparatus, at least one of address information to be imported and transmission destination information to be imported.

16. The data communication apparatus according to claim 15, wherein the at least one processor executes the instructions to
import all of address information acquired from the third data communication apparatus.

17. The data communication apparatus according to claim 10,
further comprising a scanner that reads a document image to generate image data,
wherein the at least one processor executes the instructions to transmit the image data generated by the scanner.

* * * * *